United States Patent [19]

Dobbins et al.

[11] Patent Number: 4,895,488

[45] Date of Patent: Jan. 23, 1990

[54] MANIPULATOR MOUNTED TRANSFER PLATFORM

[75] Inventors: James C. Dobbins; Mark A. Hoover; Kay W. May, all of Idaho Falls; Maurice J. Ross, Pocatello, all of Id.

[73] Assignee: United States Department of Energy, Washington, D.C.

[21] Appl. No.: 256,431

[22] Filed: Oct. 12, 1988

[51] Int. Cl.[4] ..................... B65G 63/00

[52] U.S. Cl. ..................... 414/749; 901/6

[58] Field of Search ............... 376/269, 268, 262, 260; 414/749, 751, 608, 146; 901/6; 108/137, 152, 51.1; 248/214; 269/16, 46, 56, 84

[56] References Cited

U.S. PATENT DOCUMENTS

| | | | |
|---|---|---|---|
| 2,659,491 | 11/1953 | Williams | 248/214 |
| 3,095,095 | 6/1963 | Mettetal et al. | 376/268 |
| 3,780,971 | 12/1973 | De Filipps | 248/214 |
| 4,137,984 | 2/1979 | Jennings et al. | 414/608 |
| 4,683,109 | 7/1987 | Cooper, Jr. et al. | 376/261 |
| 4,773,922 | 7/1987 | Ross et al. | 55/481 |

OTHER PUBLICATIONS

Dobbins, "Design of the Fuel Processing Facility for Remote Operability", Winter Meeting of the American Nuclear Society, Nov. 11-15, 1987.

*Primary Examiner*—Daniel Wasil
*Attorney, Agent, or Firm*—Robert J. Fisher; Thomas G. Anderson; William R. Moser

[57] ABSTRACT

A transfer platform for the conveyance of objects by a manipulator includes a bed frame and saddle clamp secured along an edge of the bed frame and adapted so as to secure the bed frame to a horizontal crosspiece of the manipulator. The platform may thus move with the manipulator in a reciprocal linear path defined by a guide rail. A bed insert may be provided for the support of conveyed objects and a lifting bail may be provided to permit the manipulator arm to install the bed frame upon the crosspiece under remote control.

16 Claims, 2 Drawing Sheets

MANIPULATOR MOUNTED TRANSFER PLATFORM

CONTRACTUAL ORIGIN OF THE INVENTION

The U.S. Government has rights to this invention pursuant to Contract No. DE-AC07-84ID12435 between the U.S. Department of Energy and Westinghouse Electric Corporation.

BACKGROUND OF THE INVENTION

The present invention relates to a manipulator apparatus designed to permit the remote controlled manipulation of tools and other devices and, specifically, is related to a transfer platform adapted for use with a manipulator apparatus used in the operation and maintenance of a nuclear fuel reprocessing facility.

Remote controlled manipulator devices, also known as vertical or horizontal bridge manipulators, are commonly employed in the operation and maintenance of nuclear power plants and related facilities, such as nuclear fuel reprocessing operations. Such manipulators are usually mounted to a pair of upper and lower parallel guide rails for reciprocal linear movement thereon, and include an articulated arm connected to a carriage. The manipulator arm is adapted to move at least horizontally and vertically, and may be provided with a hook-like gripping device commonly referred to as a hand. The hand is adapted to be remote controlled to pick up and/or otherwise manipulate objects within a controlled access chamber, such as within an area exposed to radioactivity. Conventional manipulators have lifting capacities in the range of 150 pounds. An overhead crane may be provided for the manipulation of heavier components.

Radioactive fuel reprocessing facilities may be designed with a plurality of individual processing cells or chambers in linear arrangement, each chamber having a wall in common with an elongate pump and valve (P&V) corridor. The processing apparatus of each chamber in such a facility may be designed such that process pipe sections would protrude through the common wall and into the P&V corridor, where connection to appropriate pumps and valves requiring periodic maintenance would be made. The remainder of the piping, located within the chamber, would be permanently welded due to its lack of required periodic maintenance. At least one manipulator may be adapted to travel along a guide rail extending substantially the full length of the P&V corridor to perform remote controlled maintenance on the pumps and valves connected to each chamber.

A major drawback of conventional remote controlled manipulators is the absence of any accommodation on the manipulator itself for the storage or transport of pumps, valves, or other components. Instead, a manipulator and/or an overhead crane used in a P&V corridor would be required to make frequent trips to and from a component supply area to perform required periodic maintenance on the pumps and valves of one or more processing chambers.

One attempted solution to this problem is the provision of a self-propelled cart designed to be mounted on a separate rail system. This cart and rail system would be disposed in the P&V corridor substantially parallel to the manipulator guide rail. However, such a cart and rail system may cause considerable inconvenience for operating personnel in the maintenance room, as it would be an obstacle to performing maintenance on the manipulator. In addition, such a cart and rail system would add significantly to the overall construction and maintenance costs of the fuel reprocessing facility.

Thus, there is a need for a device adapted to transport articles in close proximity to a remote controlled manipulator of the type used in a nuclear fuel reprocessing facility. Such a device would preferably possess the characteristics of easy installation upon existing manipulator structures and light weight construction to permit installation of the device upon the manipulator by the manipulator arm itself. Furthermore, such a device would not impair operator visibility of the manipulator area and would have a minimum of moving parts which require maintenance.

SUMMARY OF THE INVENTION

Accordingly, a manipulator mounted transfer platform is disclosed including a bed frame and a saddle clamp secured to the frame along an edge thereof, and adapted to clamp the bed frame upon a horizontal support member of a manipulator so that the bed frame provides a conveying surface. The manipulator mounted transfer platform also may include an insert fabricated of a sheet of either solid or expanded metal, the latter material being of lighter weight and providing greater operator visibility. The insert is designed to be placed upon the bed frame for transport of smaller components.

In addition, a lifting bail may be provided to permit the hand of the manipulator arm to lift and install the platform upon the frame of the manipulator. The design of the saddle clamp facilitates such remote controlled installation and removal

DESCRIPTION OF THE PREFERRED EMBODIMENT

Figure 1:
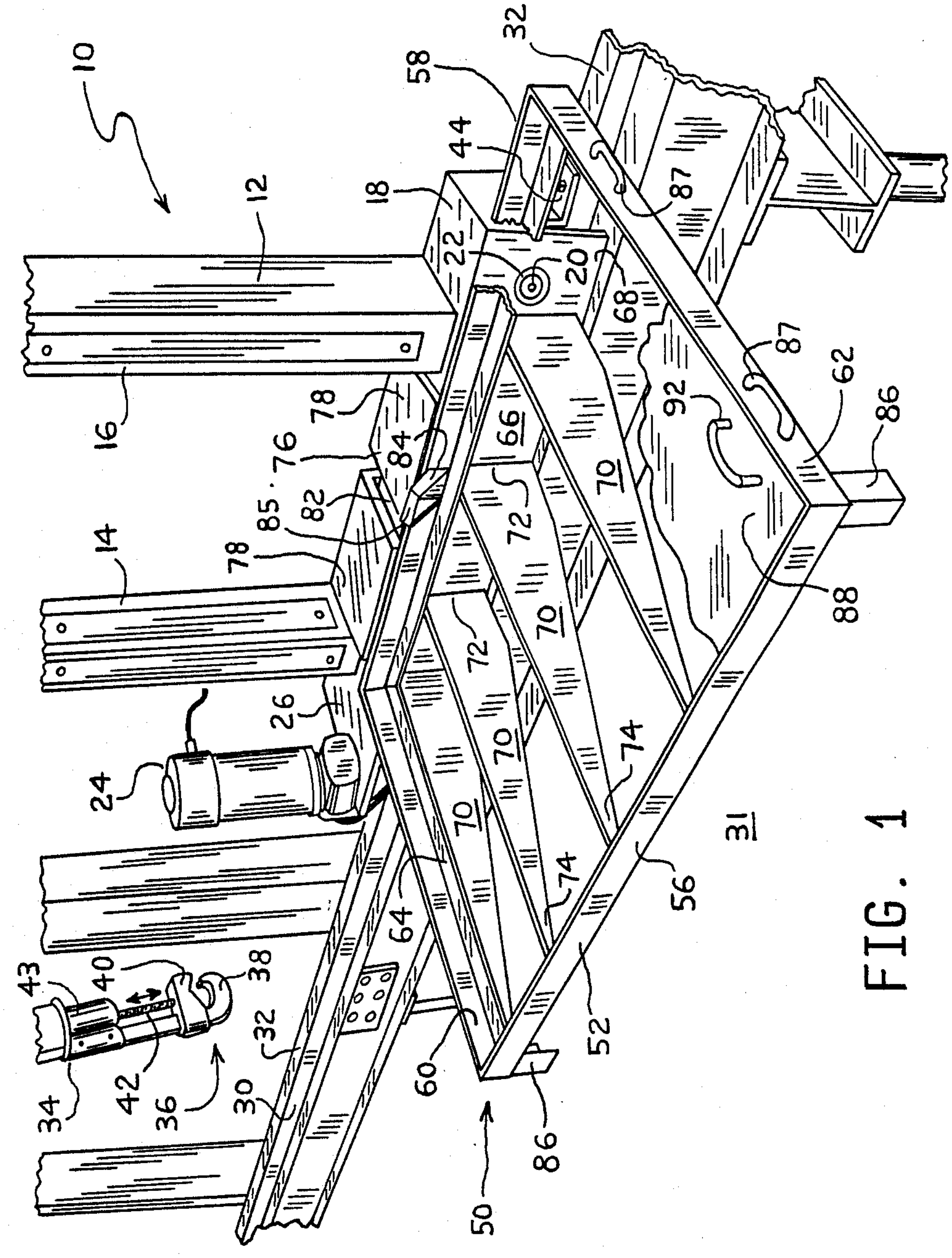
FIG. 1 is a front perspective elevational view of the manipulator mounted transfer platform of the invention shown mounted upon the manipulator frame with certain parts broken away for clarity.

Referring now to the drawings, wherein like reference characters designate identical features, an electromechanical vertical bridge manipulator, generally designated 10, is depicted in FIG. 1. Although not described herein, the use of the transfer platform of the invention with a horizontal manipulator (not shown) is contemplated. The manipulator 10 includes a frame 12 having a pair of vertical supports 14 and 16 and upper and lower crosspieces 18 (upper crosspiece not shown). The lower crosspiece 18 is provided at each end thereof with a transverse axle 20 located within a sealed bearing assembly 22. A flanged wheel (not shown) is axially engaged upon the axle 20 for rotation thereon. A manipulator drive motor 24 is secured to an extended motor mount 26 which is integral with an upper surface of the crosspiece 18. The motor 24 is provided with a conventional drive system such as a drive sprocket and chain assembly (not shown) in conventional fashion to provide motive force for the manipulator 10.

The manipulator 10 is adapted to travel in a reciprocal linear fashion along a guide device such as a pair of upper and lower guiderails 30 (only the lower guide rail is shown). The guide rail 30 is secured to a floor 31 of a controlled access facility such as a P&V corridor or an adjacent maintenance area. In the preferred embodiment, the guide rail 30 has an upper contact surface 32 upon which the roller wheels (not shown) rotate to provide a low friction engagement between the manipulator 10 and the rail 30.

The manipulator 10 is further provided with a manipulator arm 34 which is secured to the frame 12 by a vertical carriage (not shown) of conventional design which permits the manipulator arm to move at least in desired horizontal and vertical directions under remote control. Movement of the arm 34 in other directions is contemplated. At a free end 36 of the manipulator arm 34, a hook-like manipulator hand 38 is provided. The hand 38 includes a clamping saddle or thumb 40 secured to a threaded rod 42. The threaded action of the rod 42 within a portion 43 of the arm 34 will allow the thumb 40 to slide vertically upon the hand 38 so as to clampingly secure conveyed articles from undesired movement during lifting.

The manipulator crosspiece 18 is provided with a manipulator stop 44 at each end thereof to prevent the derailment of the manipulator 10 from the rail 30. The stop 44 operates by engaging a hard travel limit stop (not shown) attached at each end of the rail. An additional function of the stop 44 is as a rail sweep which removes debris from the rail surface 32. The stop 44 may also be provided with cam rollers (not shown) which can be adjusted to center the lower flanged manipulator wheels upon the rail 30. The stop 44 is depicted as an "L" bracket, but other configurations are contemplated.

The manipulator mounted platform of the invention, generally designated 50, includes a bed frame 52 having a preferably rectangular configuration defined by spaced apart, parallel front and rear members 56 and 58 and by a pair of side members 60 and 62 also disposed in spaced apart, parallel relation to each other. The front, rear and side members 56, 58, 60 and 62 are preferably fabricated of conventional L-shaped angle iron stock, and as such form a lip 64 around the inner peripheral margin of the frame 52. The frame 52 is further provided with a backplate 66 which is secured in depending fashion to an exterior of the rear member 58 and extends to the lower margin 68 of the crosspiece 18.

A plurality of tapered gussets 70, each of which having a base 72 and a pointed end 74, are each secured at the base 72 to the backplate 66 and at the pointed end 74 to the front member 58 along an underside of the lip 64. The gussets 70 are placed in parallel, spaced relation to each other to provide adequate support to the frame 52 for loads which may be transported by the platform 50. The respective bases 72 are located adjacent the rear member 58 due to the fact that the bending moment of loads transported by the platform 50 increases closer to the manipulator frame 12. The bases 72 of the tapered gussets 70 are codimensional with the backplate 66 in that they do not depend beyond the lower margin 68 of the crosspiece 18.

Figure 4:
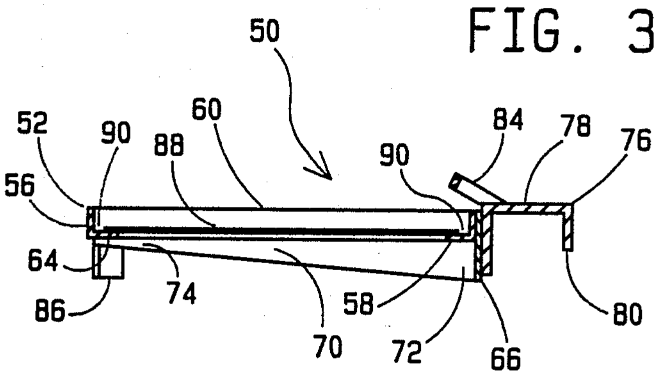
FIG. 4 is a sectional view taken along the line 4—4 of FIG. 3 and in the direction indicated generally.

A mounting device, such as a saddle clamp 76, is secured to the rear frame 58 and projects generally horizontally therefrom towards the crosspiece 18 of the manipulator frame 12. The saddle clamp 76 is generally provided in the form of an inverted 'U' defined in part by the backplate 66. The clamp 76 further includes a top portion 78 and a depending rear bearing surface or flange 80 (best seen in FIG. 4). The rear flange 80 is provided in sufficient length to keep the platform 50 from falling off the crosspiece 18. The saddle clamp 76 is dimensioned to snugly fit over the crosspiece 18 yet be slidably releasable therefrom; however, it is contemplated that the clamp 76 may be adapted to be permanently affixed to the crosspiece 18.

Figure 2:
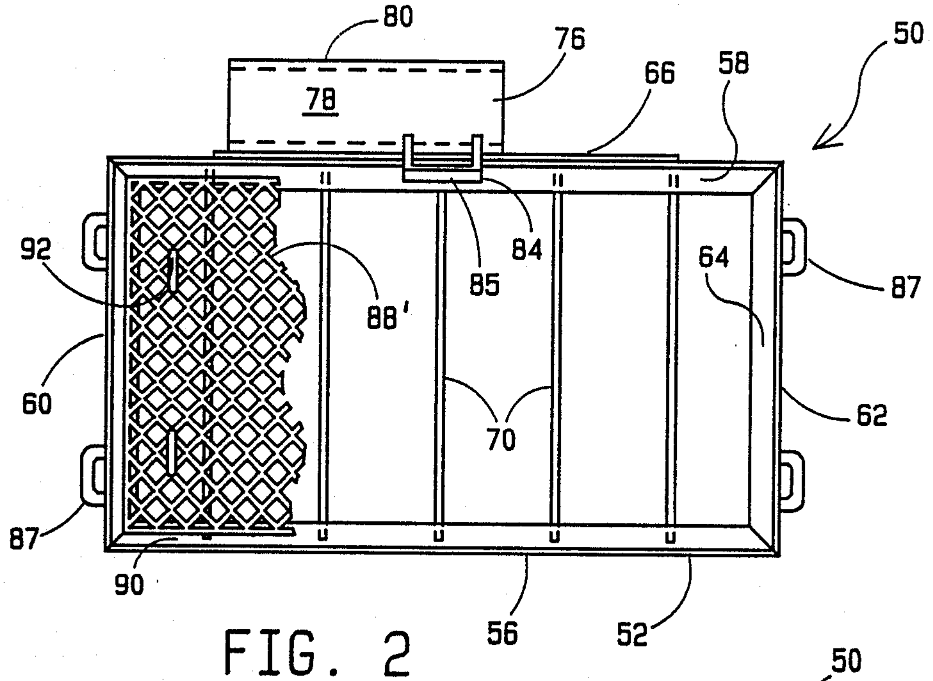
FIG. 2 is a plan view of the transfer platform of the invention equipped with an alternate bed insert.
Figure 3:
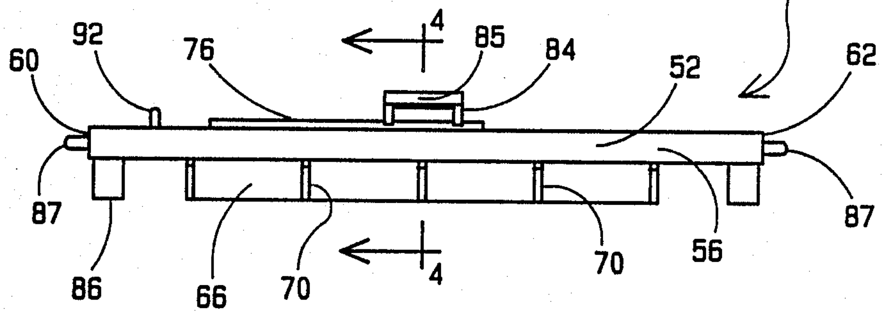
FIG. 3 is a front elevational view of the platform as depicted in FIG. 2.

Also, in the preferred embodiment, the saddle clamp 76 is provided in two portions which are separated by a gap 82. The gap 82 is designed to prevent any restriction in the movement of the manipulator drive mechanism, such as a manipulator bridge drive chain idler sprocket (not shown). It is also contemplated that a one piece clamp 76' be available (best seen in FIG. 2). Such a clamp 76' would have a top 78' and a depending flange 80'. In addition, it is preferred that the saddle clamp 76 be mounted off-center, or closer to the side frame member 60 to enable the frame 52 to be offset to the right in FIG. 1 relative to the manipulator frame 12 to provide clearance for the motor mount 26.

A lifting bail 84 may be secured to the bed frame 52 such as along the inner edge of the rear frame member 58 to enable the manipulator hand 38 to lift and install the platform 50 upon the manipulator crosspiece 18 by remote control. In the preferred embodiment, the lifting bail 84 is situated at an approximate 120° angle relative to the rear frame member 58 in order to locate the lift point of the platform 50 at its center of gravity. The bail 84 is provided with a crossmember 85 which is configured to be sandwiched between the hand 38 and thumb 40 of the manipulator arm 34 for positive retention therein. During fabrication, the crossmember 85 may be oriented as necessary to easily engage the hand 38 and thumb 40.

If desired, a pair of support legs 86 may be attached to the front frame member 56 to enable the platform 50 to rest squarely on the floor 31 when not installed on the manipulator 10. In addition, the bed frame 52 may be provided with horizontally projecting platform handling grips 87 secured to each side member 60, 62 to facilitate manual orientation of the platform 50.

Figure 5:
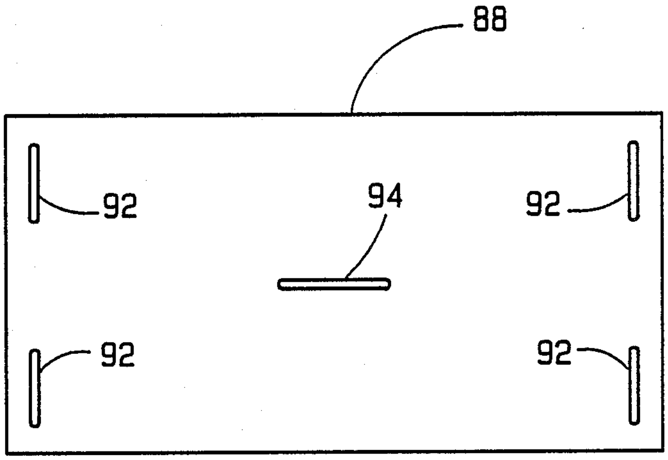
FIG. 5 is a plan view of the bed insert depicted in FIG. 1.

In instances where relatively small or numerous objects are desired to be transported by the platform 50, a bed frame insert 88 may be provided. The insert 88 is generally a sheet of steel, either solid as shown in FIGS. 1 and 5, or of expanded configuration (best seen in FIG. 2 as 88'). The insert 88' may be preferable in applications where operator visibility of the floor 31 is desired. The inserts 88, 88' are dimensioned to be placed upon the bed frame 52 so as to engage the lip 64 along an outer peripheral edge margin 90 (best seen in FIG. 5). The inserts 88, 88' may be provided with a plurality of gripping handles 92 adapted for manual placement upon the bed frame 52. In addition, or as an alternative, the inserts 88, 88' may have a lifting loop 94 (see FIG. 5) which would enable remote controlled replacement by the manipulator 34. When either of the inserts 88, 88' are not utilized, objects to be transported by the platform 50 may be placed directly upon the gussets 70.

Although it is preferred that the insert 88 be releasably mounted within the bed frame 52 to allow easy replacement should the insert become overly contaminated with radioactive material, it is contemplated that in some cases the inserts 88, 88' may be fixed to the frame 52. The inserts 88, 88' may be fixed to the bed frame 52, or, more accurately, a one-piece bed frame may be fabricated by cutting notches or tabs (not shown) in each corner of a flat sheet, folding the tabs vertically and welding the tabs together to form corners. In such cases, the insert 88 and the frame 52 may be disposed of as a unit.

The components of the platform 50, including the frame 52, the gussets 70, the backplate 66 and the saddle clamp 76 are preferably fabricated of a grade of structural steel commonly utilized in nuclear power facilities. A key criterion to consider in the design and fabrication of the platform 50 is that the total weight of the platform should be kept within the lifting capability of the manipulator (i.e., approximately 150 pounds) so that the platform 50 may be installed or removed therefrom by remote control.

In operation, the platform 50 of the invention may be installed upon the crosspiece 18 of the manipulator 10, either manually in a decontaminated maintenance room or in a relatively contaminated area such as a P&V corridor. In the latter case, the manipulator hand 38 would be remotely controlled to engage the gripping surface 85 of the lifting bail 84 and the thumb 40 would be adjusted downwardly to provide a secure grip thereof. The manipulator arm 34 will orient the platform 50 such that the mounting saddle clamp 76 is situated to slide over the crosspiece 18 of the manipulator frame 12 between the vertical supports 14 and 16. Once the platform 50 is securely placed upon the manipulator frame 12, objects to be transported may be placed upon the gussets 70, or alternatively, upon the insert 88 if that is provided. Objects which are heavier than the capacity of the manipulator arm 34 may be placed upon the platform 80 by a crane (not shown).

The platform 50 is thus adapted to move in a linear reciprocal fashion in unison with the manipulator 10, and may be used to convey desired articles such as pumps or valves or components thereof to be used in a P&V corridor along the length of the guide rail 30. The platform 50 is adapted to be fabricated of light weight yet disposable material so that if and when the platform becomes overly contaminated, it may be readily replaced While a particular embodiment of the manipulator mounted transfer platform of the invention has been shown and described, it will be appreciated by those skilled in the art that changes and modifications may be made thereto without departing from the invention in its broader aspects and as set forth in the following claims.

The embodiments of this invention in which an exclusive property or privilege is claimed are defined as follows:

1. In a manipulator system for use in hazardous environments including a manipulator adapted for reciprocal movement upon a guide device, a transfer platform comprising:

a bed frame defining a generally horizontal bed projecting outwardly from the manipulator; and frame mounting means securing the bed frame to the manipulator in a generally cantilevered fashion, thereby essentially minimizing the structure necessary to support the platform outwardly of the manipulator while enhancing operator visibility of the platform and the manipulator during use of the manipulator system.

2. The platform as defined in claim 1 further including a bed insert adapted to be placed upon said bed to provide conveying surface.

3. The platform as defined in claim 2 wherein said bed insert is fabricated of expanded metal.

4. The platform as defined in claim 2 where said bed insert is releasably mounted upon said frame bed.

5. The platform as defined in claim 1 wherein said frame is an open rectangular structure supported by a plurality of spaced parallel support members extending from said manipulator.

6. The platform as defined in claim 5 wherein said support members are tapered gussets.

7. The platform as defined in claim 1 wherein said mounting means is adapted to be releasably secured to a substantially horizontal member in the manipulator.

8. The platform is defined in claim 7 wherein said mounting means is at least one saddle clamp.

9. The platform as defined in claim 1 further including a lifting bail secured to said frame.

10. The platform as defined in claim 9 wherein said lifting bail is secured to an edge margin of said frame in close proximity to said horizontal bed.

11. In a manipulator system including a vertical bridge manipulator and platform combination comprising:

a manipulator frame including a plurality of spaced vertical supports connected by at least one horizontal crosspiece, said manipulator frame adapted for reciprocal linear involvement along a guide device;

a manipulator arm and hand assembly mounted to said manipulator frame for remote controlled movement; and a platform projecting outwardly from said crosspiece having a bed frame provided with mounting means adapted to secure said bed frame along an edge thereof to said crosspiece in a cantilevered fashion and to move in unison therewith.

12. The combination as defined in claim 11 further including a bed insert adapted to be placed upon said bed frame.

13. The combination as defined in claim 12 wherein said insert is designed to be releasably placed upon said bed frame.

14. The combination as defined in claim 11 including a lifting bail providing a lift point for the platform secured to said platform projecting outwardly and upwardly from said mounting means in a fashion substantially locating the lift point at the center of gravity of the platform.

15. A vertical bridge manipulator and platform combination comprising:

a manipulator frame including a plurality of spaced vertical supports connected by at least one horizontal crosspiece, said manipulator frame adapted for reciprocal linear involvement along a guide device;

a manipulator arm and hand assembly mounted to said manipulator frame for remote controlled movement; and a platform having a bed frame provided with mounting means adapted to secure said bed frame along an edge thereof to said crosspiece to move in unison therewith;

wherein said mounting frame means is at least one saddle clamp having an inverted "U" shape.

16. The combination as defined in claim 15 further including a lifting bail providing a lifting point for the platform secured at an appropriate 120° angle to said saddle clamp.

* * * * *